DATA STORAGE WITH RATE CORRECTION

Filed March 28, 1952 3 Sheets-Sheet 1

INVENTOR
JOHN W. DOWNS
BY James V. Malone
ATTORNEY

Sept. 28, 1965 J. W. DOWNS 3,209,133

DATA STORAGE WITH RATE CORRECTION

Filed March 28, 1952 3 Sheets-Sheet 2

INVENTOR
JOHN W. DOWNS
BY James P. Malone
ATTORNEY

DATA STORAGE WITH RATE CORRECTION

Filed March 28, 1952

INVENTOR
JOHN W. DOWNS
BY James V. Malone
ATTORNEY 3,209,133

DATA STORAGE WITH RATE CORRECTION

John W. Downs, Glen Cove, N.Y., assignor to Sperry Rand Corporation, a corporation of Delaware Filed Mar. 28, 1952, Ser. No. 279,231
9 Claims. (Cl. 235—179)

This invention relates to electronic computing circuits and more particularly to data storage circuits with rate correction.

In the computing field there is frequently a need for apparatus which will receive and store a multiplicity of different data, and which is capable of sorting out this data and of predicting future data. For instance, in an automatic search and tracking radar system, a great many signals are received from various targets and it is necessary to select the received data pertaining to a particular target which it is desired to track. It is also desirable to compute the rate of change of this particular data with respect to time, so as to predict the position of the target in the intervals between receiving data, and also as an aid to correlating new data with already received data. In certain cases, the data is not of a periodic nature but it is received in an irregular or aperiodic manner which factor complicates sorting and predicting functions.

Therefore, the primary purpose of the present invention is to provide means to receive a multiplicity of different data, and means to sort and extrapolate the data so as to provide a continuous indication. The data may be aperiodic and received in no specified order or time sequence.

The general outline of the invention is as follows. Old data is stored in a storage circuit and new data is continuously compared to the particular stored data that is of interest. When a new reading is received from the particular target under consideration, the new data is also stored. The difference between the old and new data is obtained and a time function of this difference is also obtained. This time function is the change of the data with respect to time, and it is added to the last received data in order to predict the occurrence of further new data. When further data is received, it is also compared with the continually corrected, i.e. predicted data, and a time function of the difference is taken. These steps are continually repeated so that there is always present a continual corrected approximation of the target position. Sorting or selecting circuits and time function circuits are provided so that the data need not be periodic and need not be received in any particular sequence.

The time function circuit may be a motor driven potentiometer to which a difference function is supplied. The output of the potentiometer is a proportional part of the difference voltage which is a function of time. The potentiometer may be driven at a predetermined rate by a constant speed motor, or for more accurate work the rate of speed may be varied in accordance with the rate of change of the data.

Therefore, the present invention performs the following functions.

(1) It recognizes new data samples associated with stored data i.e. a selected target.

(2) It discards the old data and retains the new.

(3) It continually corrects the data last received.

The system may be used with single dimensional data for instance altitude, or it may be expanded to utilize multidimensional data, for instance, bearing and range, or even bearing, range, and altitude.

A principal object of the invention is to obtain a voltage which is a function of the difference between old and new data with respect to time.

Another object of the invention is to predict new data based on the time rate of change of preceding data.

Another object of the invention is to store various different data and to sort out and select new data by comparison with its related old data.

Another object of the present invention is to obtain a quantity proportional to the time rate of change of aperiodic data.

Another object of the invention is to store and continuously correct multi-dimensional data.

Another object of the invention is to store different multi-dimensional data, to correlate new data with its corresponding stored data and make continual corrections of the stored data.

Another object of the present invention is to store multi-dimensional data in which the stored data is continually corrected at a calculated rate.

Another object of the invention is to store aperiodic multi-dimensional data in which the stored data is continually extrapolated at a calculated rate.

Another object of the invention is to store data, correlate new data with its corresponding old data and predict further new data.

Another object of this invention is to provide means for selecting a desired set of data from an ensemble of data in which the desired set of data have no degree of periodicity, either in time or sequence.

Another object is to provide means for sorting data in more than one dimension, such as two or three dimensional radar data.

Another object is to provide means having a variable tolerance on the error of the datum that is to be accepted, so that the error in one dimension may be made to modify the tolerance on acceptance in another dimension.

Another object is to provide means for predicting the future "position" of the desired N-dimension datum from past aperoidic samples of data.

Another object is to provide means for continuously indicating the instantaneous prediction of the data between the points of accepting actual data.

These and other objects may be better appreciated from the following specification and figures of which:

Figure 1:
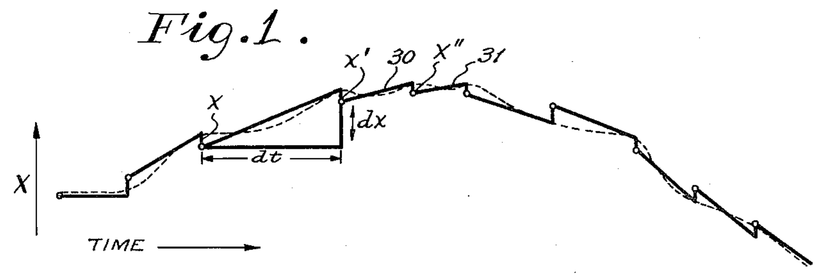
FIG. 1 is a graph illustrative of the operation of the invention.

FIGURE 1 is a graph showing plotted data. Particular old data is shown at $x$ and the new data shown at $x'$. The difference between $x$ and $x'$ is the change of voltage $dx$. A difference in time between the old and new data is the change of time $dt$. The rate of change of data with respect to time $dx/dt$ is added to the new data value to produce a predicted value as shown by the line 30. The next data received is platted at $x''$. The value of $x''$ will be identified as associated with the target, since it is closely related to the locus 30 of the predicted value. At the time when the data $x''$ is received, it is compared with $x'$ and a new rate is computed which is used to provide a new prediction shown by the line 31. It is noted that the data need not be received in periodic fashion.

Figure 2:
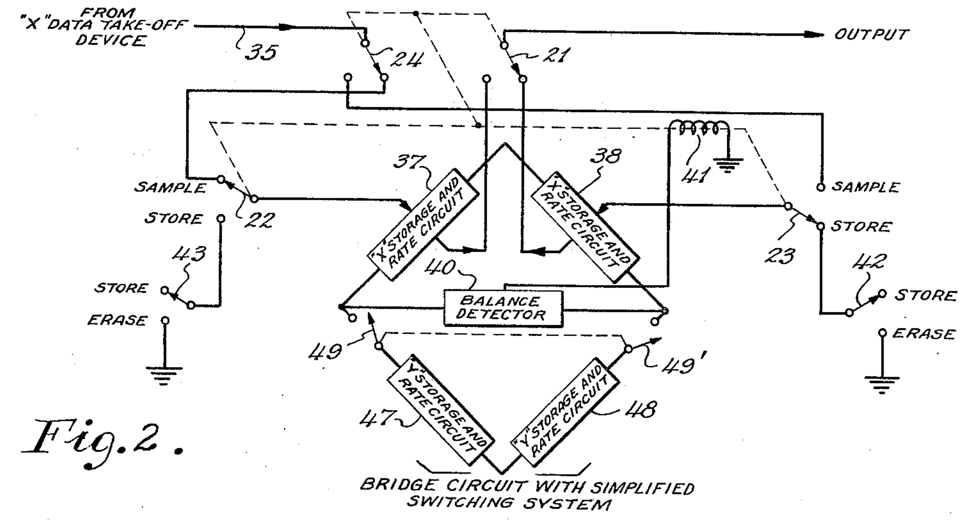
FIG. 2 is a schematic block diagram of a bridge type sorting circuit.

FIGURE 2 shows a schematic sorting circuit with simplified switching. Data is received on input 35 and applied through the switches 24 and 22 or 23 to one of the "$x$" storage and rate correction circuits 37 or 38. In the switch position shown, the circuit 38 is storing the old data and the circuit 37 is sampling the new data. When new data is received which is closely related to the old data as corrected the balance detector 40 is energized. The balance detector 40 energizes relay 41, to actuate the switches 21, 22, 23 and 24. Thus, the storage circuit 37 now stores the data and the voltage storage circuit 38 is now available to receive or sample new data. Before a storage circuit is switched from storage to sample position, it is discharged and "erased" by switches 42, 43.

The Y-storage circuits 47 and 48 are adapted to store data in the second dimension and operate exactly the same way as the X storage circuits 37 and 38. The Y switching units are identical and are not shown. The balance detector 40 may be made responsive to the comparison of values in one dimension only, or may be made responsive to the comparison of the combination of values of two dimensions by means of switches 49, 49'. This will be discussed more fully in connection with FIGURE 5. The balance detector 40 may be a relay which is energized when its inputs are made equal as will be shown more fully.

Figure 3:
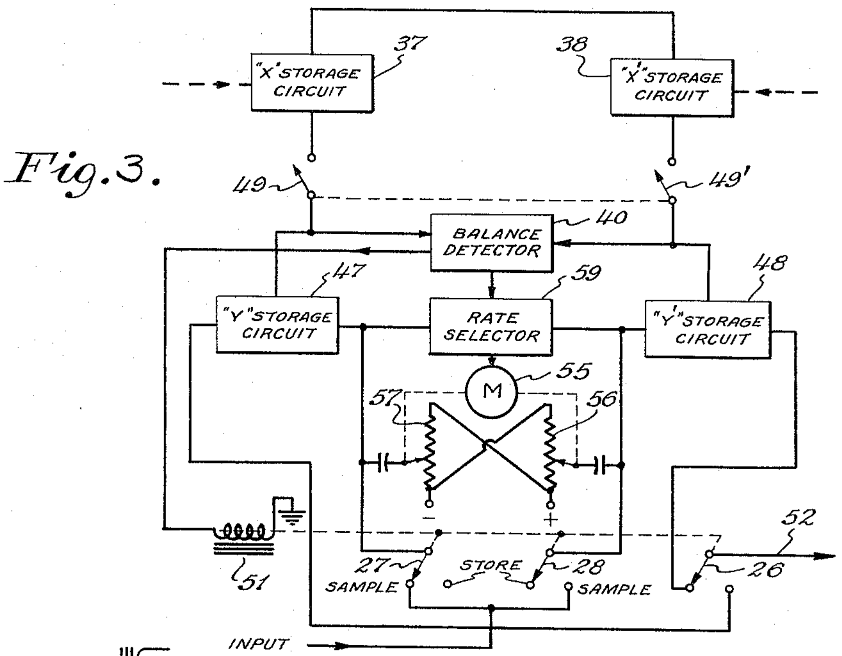
FIG. 3 is a schematic block diagram of an embodiment of the present invention.

FIGURE 3 shows a schematic block diagram of a bridge type circuit like FIGURE 2 which provides an output on lead 52 which is continually corrected at a calculated rate. In this embodiment the speed of the motor 55 is varied by rate selector 59 so it will provide a close approximation of the predicted value than the embodiment of FIGURE 1, for instance, where the motor is driven at a predetermined average speed. Otherwise, the circuit of FIGURE 3 operates generally the same as that of FIG. 2.

There are four storage circuits provided in a bridge arrangement as in FIGURE 2. These four circuits are X storage circuit 37, the X' storage circuit 38, the Y storage circuit 47 and the Y' storage circuit 48. The balance detector 40 is responsive to Y data or to the sum of the X and Y components depending on switches 49, 49'. The X switching and rate correction circuits are not shown since they are the same as the Y circuits shown. When the voltages appearing across the balance detector 40 are equal, its output will be energized, thereby providing a signal to relay 51 which operates the input switches 27, 28, output switch 26, and to the rate selector 59 which controls the speed of motor 55. The motor rotates the potentiometers 56 and 57 proportionately to the difference between the last two data.

Figure 4:
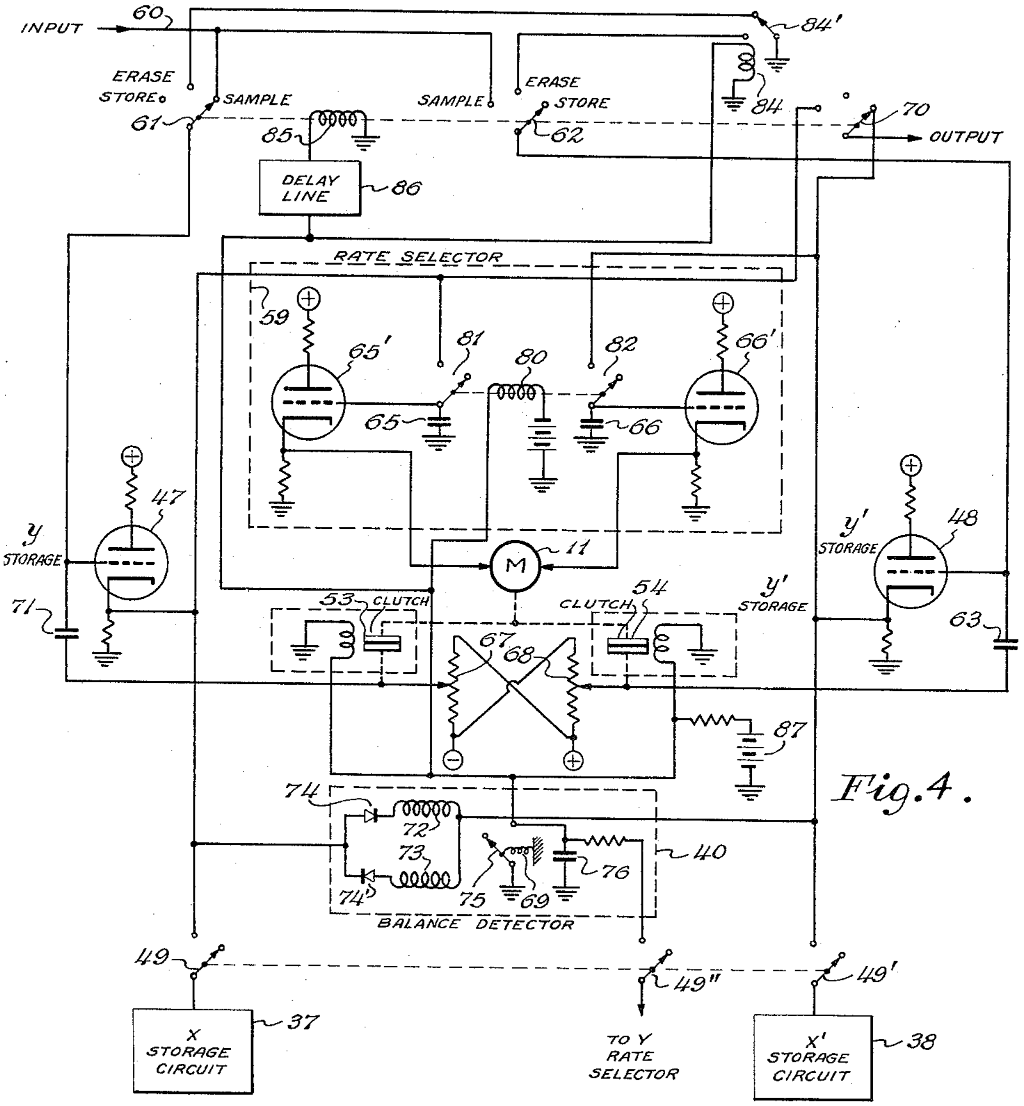
FIG. 4 is a schematic diagram of an embodiment of the invention.

FIGURE 4 shows a schematic diagram of the circuit of FIGURE 3 showing the details of the rate selecting comparison means 59 and the balance detector 40. The data input is received on lead 60 and connected through switches 61 and 62 to the appropriate storage circuit. The input is shown connected to the Y storage circuit 47 since the switch 61 is in the sample position. The Y' storage circuit 48 is in storage position and has the previous old data stored on the condenser 63. The voltage across condenser 63 is corrected at a rate proportional to the difference between the last two pieces of data received. This rate is determined by the rate selector 59 which functions as a comparison means.

The rate selector 59 comprises a pair of condensers 65, 66 which sample and store the outputs from storage tubes 47 and 48 respectively. Therefore, condenser 65 will store a first piece of data and condenser 66 will store the next one. Voltages proportional to the voltages on condensers 65 and 66 are taken from the cathode followers 65' and 66' and applied to the motor 11 in a differential manner. The rate selector 59 is therefore seen to be a comparison means by which selected data are compared and the speed of the motor is controlled by the output of the comparison means so as to be proportional to the difference between the last two selected data. The motor drives the potentiometers 67 and 68, which provide a correction voltage which is proportional to time. The correction from potentiometer 68 is added to the stored voltage on condenser 63. This corrected voltage is then taken at the output of cathode follower 48 and connected to one side of output switch 70.

The other portion of the output switch 70 is connected to the Y storage circuit comprising cathode follower 47 and condenser 71 and potentiometer 67 which operates in the same manner. The balance detector 40 is connected between the outputs of Y storage circuit 47 and Y' storage circuit 48 and is adapted to provide a pulse signal when the voltages at its two inputs are equal. The balance detector may be made responsive to both the X and Y components by connecting switch 49 and 49'.

The balance detector 40 comprises a relay having a pair of oppositely wound coils 72, 73 connected in parallel. Oppositely poled rectifiers 74 and 74' are each connected in series with one of the coils so that the unbalance current may flow in either direction to hold the relay open. There will normally be an unbalance current flowing so that the relay 75 will be open and the condenser 76 will be charged to some value by battery 87. Therefore, when a balanced condition occurs at the two inputs the relay 75, which may be spring loaded by spring 69, is closed momentarily and the condenser 76 will discharge providing a pulsed output to operate the switching relays.

Figure 6:
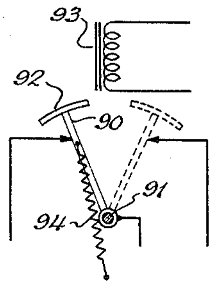
FIG. 6 is a diagram of a relay adapted to be used in the invention.

The pulse from the balance detector 40 will energize relay coil 80 in the rate selector to momentarily close the contacts 81 and 82 to correct the voltages on condensers 65 and 66. The pulse of the balance detector will also energize relay 84 which is the erasing relay, the function of which is to erase the voltage storage circuits as they go from storage to sample position. The pulse from the balance detector also energizes the relay coil 85 through delay line 96, which energizes the relays 61 and 62, so that the relay 84 is in the proper position to erase the voltage from the proper storage circuit. Delay could be introduced mechanically by providing the switches to be delayed with mechanical detents, and actuating them, by means of the spring connected to one of the undelayed switches, so that the action of the spring would be to incorporate a time lag in the operation of the delayed switches. Relays 84 and 85 are of the flip-flop type which change their associated switches 84', 61, 62 and 70 from one contact to the other on the receipt of successive pulses. Their operation is like that of the familiar pull chain electric light switch. A suitable relay is shown in FIGURE 6. Relay operated clutches 53 and 54 operate to reset the potentiometers 67 and 68.

The operation of the embodiments of FIGURES 3 and 4 may be summed up as follows:

(1) X and Y coordinates of a radar target are stored as unbalancing signals in two arms of a bridge.

(2) The opposite arms then sample a multiplicity of other data.

(3) When a set of coordinates approximately matching those stored are found, the "balance detector" is actuated.

(4) The balance detector causes the "rate selector" to sample and store the old and new data.

(5) The rate selector causes a motor to run at a speed proportional to the change in position and also causes the bridge to reverse its input and output circuits.

(6) In the reversing process the "old" datum is erased causing the bridge to unbalance again.

(7) The process will now be continued. Meanwhile an output voltage is provided which represents the last corrected target position plus a linear correction.

It is seen that the system operates by:

(1) recognizing the data samples associated with its stored data, (2) discarding the old data and retaining the new, and (3) continuously correcting the data last received.

Compared to conventional tracking circuits, the present circuit offers a particular advantage in that its acceptance or rejection of a set of coordinate data is based on a more realistic standard. In the conventional circuit, where range and azimuth gates of predetermined dimensions are used, a particular datum falling outside either gate would result in that set of coordinate data being lost. For example, in FIG. 5 the reported azimuth of a target might agree exactly with that predicted but the reported range might differ by some amount slightly outside the range acceptance gate. Thus that set of data would be lost.

In the present tracking channel, the "X" acceptance gate varies in width depending on the error in the predicted "Y" coordinate. If the "Y" error is zero, the "X" gate width is a maximum, and conversely. This is the result of using the bridge technique in which balance is a complex function of the impedance of four circuits.

Figure 5:
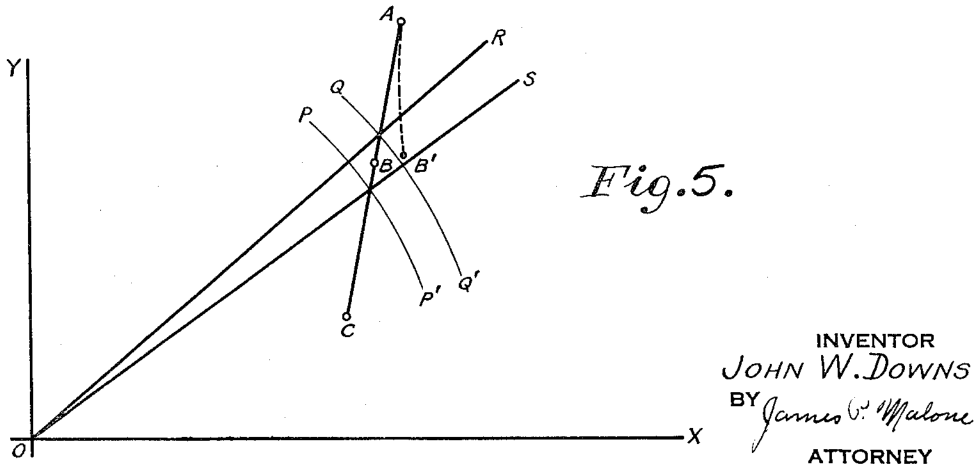
FIG. 5 is a graph illustrative of the invention.

This conception is illustrated in FIGURE 5. Let the predicted course of the target be ABC, where B is the predicted position at the instant the correct position B′ is received. The area bounded by OR, OS, PP′ and QQ′ represents a hypothetical range-azimuth gate. Although B′ is nearly correct in azimuth, it falls outside the range gate. In a conventional tracking circuit, therefore, both datum coordinates would be lost. In the present combined gate method disclosed herein, the large error in "X" of the new data point B′ is accepted because the error in "Y" is small.

While the present tracking system has been discussed in connection with the tracking of "X" and "Y" coordinates only, it is applicable to the tracking of the altitude coordinate as well.

FIG. 6 illustrates a relay of the flip-flop which is adapted to flip from one of two positions to the other, in response to an energizing signal. The relay arm 90 is pivoted at the point 91 and has a weight 92 of magnetic material at its free end. When the coil 93 is energized by a pulse of energy the relay arm 90 rises from the left hand position and its momentum carries it over to the right hand position. Spring 94 operates as a detent providing positive switch action. The next pulse of energy appearing on coil 93 will move the relay armature from the right hand position back to the left hand position. Therefore, the operation is like that of a flip-flop circuit and the position of the relay armature 90 alternates from one extremity to the other in response to pulses of energy on the energizing coil 93.

An alternative flip-flop relay might be a step relay of the type having a plurality of contacts arranged in a circle and an arm which rotates in steps and responds to successive pulses. If alternate contacts were connected together, it would operate as a flip-flop circuit.

Figure 7:
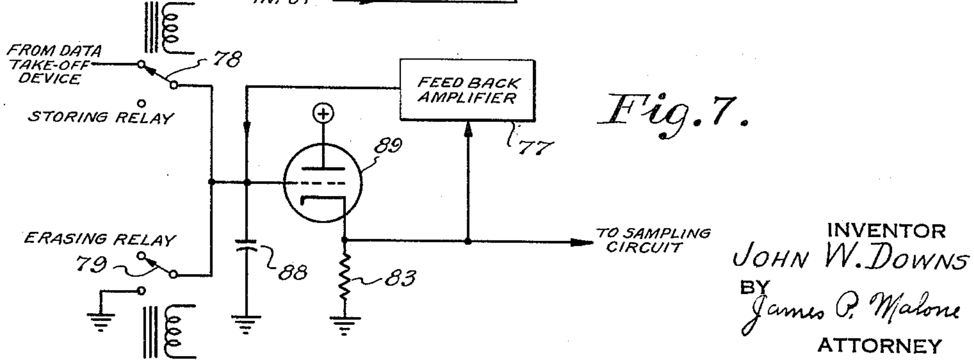
FIG. 7 is a schematic diagram of a voltage storage circuit.

FIGURE 7 shows a typical storage circuit. The input is stored on condenser 88 and also is applied to the grid of the vacuum tube 89. The output is taken across the cathode resistor 83. The time constant and stability of the storage circuit is improved in a well known manner by providing a feedback signal through feedback amplifier 77 from the outside to the input of tube 85. The sequence of operation of the relays is as follows. Samples are applied to the upper position of relay arm 78 and when the proper value is chosen as previously explained, the relay arm is connected to the lower storing position. The storage circuit is erased by means of relay 79 which discharges the voltage on condenser 84 before the relay 78 is returned to the sampling position.

Therefore, the present invention provides means for continuously correcting multi-dimension data. The data is not required to be periodic or any particular time sequence. The invention is not limited to radar systems but may be used in various types of computers such as those used in the solution of gun fire problems, navigation problems or ballistics problems. The invention is not limited to computing but may be utilized for instance in inspection or quality control of physical items where two or more characteristics of the items may be compared against standard quantities. For instance, the present invention could be used to compare the diameter and weight of ball bearings with standard quantities, the capacity and leakage of condensers against standard values, or the color and intensity of light from bulbs.

The present invention could also be used in the receiving equipment of a data transmission system where the transmitting link must be time shared between several data generators and the continuous record of each generator output provided at the receiver.

What is claimed is:

1. A data discriminator comprising a first pair of storage means connected in the conjugate arms of a bridge, a second pair of storage means connected in conjugate arms of said bridge, means to impress a first series of successive data alternately upon each of said first pair of storage means, means to impress a second series of successive data alternately upon each of said second pair of storage means, comparison means connectably disposed to receive the data signals of said first pair of storage means for producing an output signal proportional to the difference therebetween, balance detector means connected between opposite junctions of said two pairs of conjugate arms and responsive to a determinable degree of unbalance between said first and second data for connecting said first pair of storage means to said comparison means, whereby said output signal is continuously corrected to reflect data changes within the limits of said determinable degree of unbalance.

2. A data discriminator comprising a first pair of storage means connected in the conjugate arms of a bridge, a second pair of storage means connected in conjugate arms of said bridge, means to impress a first series of successive data alternately upon each of said first pair of storage means, means to impress a second series of successive data alternately upon each of said second pair of storage means, first comparison means connectably disposed to receive the data signals of said first pair of storage means for producing a first output signal proportional to the difference therebetween, second comparison means connectably disposed to receive the data signals of said second pair of storage means for producing a second output signal proportional to the difference therebetween, balance detector means connected between opposite junctions of said two pairs of conjugate arms and responsive to a determinable degree of unbalance between said first and second data for connecting said first and second pair of storage means to said first and second comparison means respectively, whereby said first and second output signals are continuously corrected in accordance with respective data changes within the limits of said determinable degree of unbalance.

3. A data discriminator comprising a first pair of storage means connected in the conjugate arms of a bridge, a second pair of storage means connected in conjugate arms of said bridge, switching means connected to receive a first series of discrete aperiodic random data and adapted to impress said data upon either storage means of said first pair, switching means connected to receive a second series of discrete aperiodic random data and adapted to impress said data upon either storage means of said second pair, first comparison means connectably disposed to receive the data signals from said first pair of storage means for producing a first output signal proportional to the difference therebetween, second comparison means connectably disposed to receive the data signals from said second pair of storage means for producing a second output signal proportional to the difference therebetween, balance detector means connected between opposite junctions of said two pairs of conjugate arms and responsive to a determinable degree of unbalance between said first and second data for actuating said first and second switching means, whereby said first and second output signals are continuously corrected to reflect respective changes of data within limits of deviation dependent upon said determinable degree of unbalance.

4. A data discriminator comprising a first pair of storage means connected in conjugate arms of a bridge, a second pair of storage means connected in conjugate arms of said bridge, switching means connected to receive a first series of discrete aperiodic random data including actuation means adapted to impress said data upon either storage means of said first pair, switching means connected to receive a second series of discrete aperiodic random data including actuation means adapted to impress said data upon either storage means of said second pair, first comparison means connectably disposed to receive data signals from said first pair of storage means for producing a first output signal commensurate with the rate of change of successively selected first data, second comparison means connectably disposed to receive data signals from said second pair of storage means for producing a second output signal commensurate with the rate of change of successively selected second data, balance detector means connected between opposite junctions of said two pairs of conjugate arms of said bridge, said balance detector being responsive to a determinable degree of unbalance for generating a signal to actuate both said switching means to their alternate positions, whereby said first and second output signals are periodically corrected in accordance with the rate of change of respective successive data selected within limits determined by the combined rates of change of sequential data within said first and second series.

5. A data discriminator in accordance with claim 4 including signal neutralizing means connected to receive said actuation signal, said neutralizing means being arranged and disposed so as to be momentarily connected to the storage means having the oldest data before said storage means receives newly selected data.

6. A data discriminator in accordance with claim 4 including time delay means connected between said balance detector and said switching means whereby to delay said actuation signal, and signal neutralizing means connected to receive said actuation signal and adapted to be momentarily connected to the storage means having the oldest data.

7. A data discriminator in accordance with claim 4 including discharge means, said means being responsive to the criteria for selection of new data to momentarily discharge the storage means having the oldest data of that series from which the new data is selected.

8. A data discriminator comprising a first pair of storage means connected in conjugate arms of a bridge, a second pair of storage means connected in conjugate arms of said bridge, switching means connected to receive a first series of discrete aperiodic random data including actuation means adapted to impress said data upon either storage means of said first pair, switching means connected to receive a second series of discrete aperiodic random data including actuation means adapted to impress said data upon either storage means of said second pair, first comparison means connectably disposed to receive data signals from said first pair of storage means for means for producing a first output signal continuously changing at the rate of change of successively selected first data, second comparison means connectably disposed to receive data signals from said second pair of storage means for producing a second output signal continuously changing at the rate of change of successively selected second data, balance detector means connected between opposite junctions of said two pairs of conjugate arms of said bridge, said balance detector being responsive to a determinable degree of unbalance for generating a signal to actuate both said switching means to their alternate positions, whereby said first and second output signals extrapolate respective rates of change of successive data selected within limits determined by the combined rates of change of sequential data of said first and second series.

9. A data discriminator comprising a first pair of storage means connected in conjugate arms of a bridge, a second pair of storage means connected to conjugate arms of said bridge, switching means connected to receive a first series of discrete aperiodic random data including actuation means adapted to impress said data upon either storage means of said first pair, switching means connected to receive a second series of aperiodic random data including actuation means adapted to impress said data upon either storage means of said second pair, first comparison means connectably disposed to receive data signals from said first pair of storage means for producing an output signal continuously changing at the rate of change of successively selected first data, second comparison means connectably disposed to receive data signals from said second pair of storage means for producing an output signal continuously changing at the rate of change of successively selected second data, means to continuously correct the last stored data signals in each of said first and second pair of storage means with said first and second output signals respectively, balance detector means connected between opposite junctions of said two pairs of conjugate arms of said bridge, said balance detector being responsive to a determinable degree of unbalance for generating a signal to actuate both said switching means to their alternate positions, whereby said first and second output signals extrapolate respective rates of change of successive data selected within limits determined by the combined rates of change of sequential data of said first and second series as compared to stored data corrected in accordance with data signals continuously predicted by extrapolation.

References Cited by the Examiner

UNITED STATES PATENTS

| | | | |
|---|---|---|---|
| 2,431,696 | 12/47 | Keister | 235—179 |
| 2,473,457 | 6/49 | Tyson | 250—27 |
| 2,516,765 | 7/50 | Ferrell | 343—7.4 |
| 2,538,027 | 1/51 | Mozley | 343—7.4 |
| 2,542,032 | 2/51 | Isbister | 343—5 |
| 2,588,209 | 3/52 | Crapuchettes | 171—95 |

MALCOLM A. MORRISON, *Primary Examiner.*

NORMAN H. EVANS, *Examiner.*